United States Patent
Gur

(10) Patent No.: US 11,823,578 B2
(45) Date of Patent: Nov. 21, 2023

(54) UNMANNED AERIAL VEHICLE (UAV) SYSTEMS AND METHODS FOR MAINTAINING RAILWAY SITUATIONAL AWARENESS

(71) Applicant: Easy Aerial Inc., Brooklyn, NY (US)

(72) Inventor: Ido Gur, New York, NY (US)

(73) Assignee: EASY AERIAL INC., Brooklyn, NY (US)

( * ) Notice: Subject to any disclaimer, the term of this patent is extended or adjusted under 35 U.S.C. 154(b) by 0 days.

(21) Appl. No.: 17/568,899

(22) Filed: Jan. 5, 2022

(65) Prior Publication Data

US 2022/0262260 A1 Aug. 18, 2022

Related U.S. Application Data

(60) Provisional application No. 63/149,887, filed on Feb. 16, 2021.

(51) Int. Cl.
| | |
|---|---|
| *G08G 5/00* | (2006.01) |
| *B64C 39/02* | (2023.01) |
| *B61L 3/00* | (2006.01) |
| *B64D 47/08* | (2006.01) |
| *B61L 15/00* | (2006.01) |
| *B64U 10/13* | (2023.01) |
| *B64U 80/86* | (2023.01) |
| *B64U 101/30* | (2023.01) |

(52) U.S. Cl.
CPC ............ *G08G 5/0013* (2013.01); *B61L 3/002* (2013.01); *B61L 15/009* (2013.01); *B61L 15/0072* (2013.01); *B64C 39/022* (2013.01); *B64C 39/024* (2013.01); *B64D 47/08* (2013.01); *B64U 10/13* (2023.01); *B64U 80/86* (2023.01); *B64U 2101/30* (2023.01); *B64U 2201/202* (2023.01)

(58) Field of Classification Search
CPC ...................................................... G08G 5/0013
See application file for complete search history.

(56) References Cited

U.S. PATENT DOCUMENTS

| 9,718,564 B1 * | 8/2017 | Beckman ................. B64F 5/40 |
| 10,538,340 B1 * | 1/2020 | Roup .................. G08G 5/0026 |

(Continued)

FOREIGN PATENT DOCUMENTS

| FR | 3037429 A1 * | 12/2016 | ........... B64C 39/024 |
| WO | WO2017114477 | * | 7/2017 |

OTHER PUBLICATIONS

Machine Translation of Han, Jianhua, International Patent Pub. No. wo2017114477A1 (Year: 2016).*

*Primary Examiner* — Jean Paul Cass
(74) *Attorney, Agent, or Firm* — Carter, DeLuca & Farrell LLP; George Likourezos

(57) ABSTRACT

An unmanned aerial vehicle (UAV) system for maintaining railway situational awareness, includes a ground station configured to be mounted to a train, a UAV including a sensor, a processor, and a memory. The sensor is configured to provide a signal indicative of condition and/or an event. The memory contains instructions, which, when executed by the processor, cause the system to: selectively deploy the UAV, from the ground station mounted to the train, receive the signal from the sensor; and determine a condition and/or an event, relative to the train, based on the sensed signal.

14 Claims, 5 Drawing Sheets

(56) References Cited

U.S. PATENT DOCUMENTS

| | | | |
|---|---|---|---|
| 2015/0331099 A1* | 11/2015 | Wu | G01S 13/876 |
| | | | 342/32 |
| 2019/0054937 A1* | 2/2019 | Graetz | B61L 23/041 |
| 2019/0106135 A1* | 4/2019 | Kumar | B64C 39/024 |
| 2021/0014231 A1* | 1/2021 | Durbin | H04W 12/088 |
| 2021/0105931 A1* | 4/2021 | Anderson, Jr. | A01B 79/005 |
| 2021/0146977 A1* | 5/2021 | Rajan Kesavelu Shekar | |
| | | | B61L 23/041 |
| 2022/0019247 A1 | 1/2022 | Dayan et al. | |
| 2022/0022362 A1* | 1/2022 | Anderson, Jr. | G06N 3/044 |
| 2022/0033078 A1 | 2/2022 | Felder et al. | |

* cited by examiner

UNMANNED AERIAL VEHICLE (UAV) SYSTEMS AND METHODS FOR MAINTAINING RAILWAY SITUATIONAL AWARENESS

CROSS-REFERENCE TO RELATED APPLICATIONS

This application claims the benefit of U.S. Provisional Application Ser. No. 63/149,887, filed Feb. 16, 2021, the entire contents of which are incorporated by reference herein.

TECHNICAL FIELD

This disclosure relates to aircraft, and more particularly, to systems and methods for maintaining situational awareness for a train using an unmanned aerial vehicle (UAV).

BACKGROUND

Currently, track maintenance is carried out through specially equipped trains that measure and inspect rail conditions as they traverse the track. Using a specialized locomotive to inspect the rail conditions is both costly (machinery and personnel) and time-consuming; it requires the track to be free of commercial use throughout inspections. Current methods for preventing burglary or theft rely almost entirely upon manned police presence to guard the train and cargo. All major train companies employ their own police force (resource protection groups) to secure the trains and cargoes as they traverse the country. However, trains often need to pause or break in remote locations where no resource protection is available. In cases of planned burglary or other nefarious activities, track hazards are purposely placed to force trains with precious cargo to stop in places without protection. Finally, train derailments are often handled at the local level in the immediate aftermath of an event. It takes time for the railway response teams to arrive. They rely on local officials' reports and descriptions to assess the situation from afar, which itself is complex, expensive, and often employs highly precise motion robotics.

Accordingly, improvements are needed to provide railway situational awareness for trains.

SUMMARY

In accordance with aspects of this disclosure, an unmanned aerial vehicle (UAV) system for maintaining railway situational awareness, includes a ground station configured to be mounted to a train, a UAV including a sensor, a processor, and a memory. The sensor is configured to provide a signal indicative of condition and/or an event. The memory contains instructions, which, when executed by the processor, cause the system to: selectively deploy the UAV from the ground station mounted to the train, receive the signal from the sensor, and determine a condition and/or an event, relative to the train, based on the sensed signal.

In an aspect of this disclosure, the instructions, when executed by the processor, may further cause the system to display, on a display, an indication of the determined condition and/or event.

In an aspect of this disclosure, the sensor may include radar. LIDAR, and/or an imaging device.

In another aspect of this disclosure, the UAV may be tethered to the ground station.

In yet another aspect of this disclosure, the instructions, when executed by the processor, may further cause the system to detect an object relative to the train based on the determined condition and/or event, classify the object based on a convolutional neural network, determine a proximity of the object relative to the train, and display a notification indicating the determined distance and the classification of the object.

In a further aspect of this disclosure, the instructions, when executed by the processor, may further cause the system to stop the train from moving in a case where the object is classified as a hazard and the proximity is within a predetermined distance of the train.

In yet a further aspect of this disclosure, the instructions, when executed by the processor, may further cause the system to transmit a command to reduce speed of the train based on the determined proximity of the object.

In an aspect of this disclosure, the instructions, when executed by the processor, may further cause the system to detect an object out of a line of sight of the train based on the determined condition and/or event, determine a proximity of the object relative to the train, and display a notification indicating the determined distance and the classification of the object.

In another aspect of this disclosure, the instructions, when executed by the processor, may further cause the system to determine an unauthorized entry or trespass on or into the train, based on the sensed signal and transmit an alert based on the determination.

In yet another aspect of this disclosure, the ground station may further include a wireless transceiver configured to communicate sensor signals and location of the UAV to a remote server.

In accordance with aspects of this disclosure, a computer-implemented method for maintaining railway situational awareness includes selectively deploying a UAV including a sensor, from a ground station mounted on a train; receiving a signal from a sensor, the signal indicative of condition and/or an event relative to the train; and determining the condition and/or the event based on the sensed signal.

In an aspect of this disclosure, the UAV may be tethered to the ground station.

In another aspect of this disclosure, the sensor may include radar, LIDAR, and/or an imaging device.

In a further aspect of this disclosure, the method may further include displaying, on a display, an indication of the determined condition and/or event.

In yet another aspect of this disclosure, the method may further include detecting an object relative to the train based on the determined condition and/or event, classifying the object based on a convolutional neural network, determining a proximity of the object relative to the train, and displaying a notification indicating the determined distance and the classification of the object.

In an aspect of this disclosure, the method may further include stopping the train from moving in a case where the object is classified as a hazard and the proximity is within a predetermined distance of the train.

In another aspect of this disclosure, the method may further include transmitting a command to reduce speed of the train based on the determined proximity of the object.

In an aspect of this disclosure, the method may further include detecting an object out of a line of sight of the train based on the determined condition and/or event, determining a proximity of the object relative to the train, and displaying a notification indicating the determined distance and the classification of the object.

In another aspect of this disclosure, the method may further include determining an unauthorized entry or trespass on or into the train and transmitting an alert based on the determination.

In accordance with aspects of this disclosure, a non-transitory computer-readable medium storing instructions which, when executed by a processor, cause the processor to perform a method including selectively deploying a UAV including a sensor, from a ground station disposed on a vehicle; receiving a signal from a sensor, the signal indicative of condition and/or an event relative to the train; and determining the condition and/or the event based on the sensed signal.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure, any features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

The disclosed technology deals with the systems and methods that provide for full situational awareness for locomotive engineers (drivers). By integrating a UAV with a train, the train maintains independent or self-reliant, end-to-end situational awareness. Trains with integrated UAV systems can deploy the UAV of such systems to monitor track conditions (regularly or as needed, for example, such as after a storm), provide defense against burglary and/or other criminal attacks (e.g., vandalism), and/or allow first responders remote/instant awareness of local events as they unfold. Furthermore, slow-moving cargo trains could operate the UAV continuously, providing a "safe corridor" for the train by detecting, classifying, and notifying the engineer of potential hazards or objects in proximity to, and including, the train and/or track itself. Such hazards can include detecting objects (e.g., pedestrians, cars, animals, downed trees, large debris, broken track, etc.) on or near the train or track ahead (or behind, above, etc.). The integrated system can be optionally connected to a train control panel so that the train can be manually and/or autonomously stopped in case of an emergency or hazard identified by the integrated system.

Figure 1:
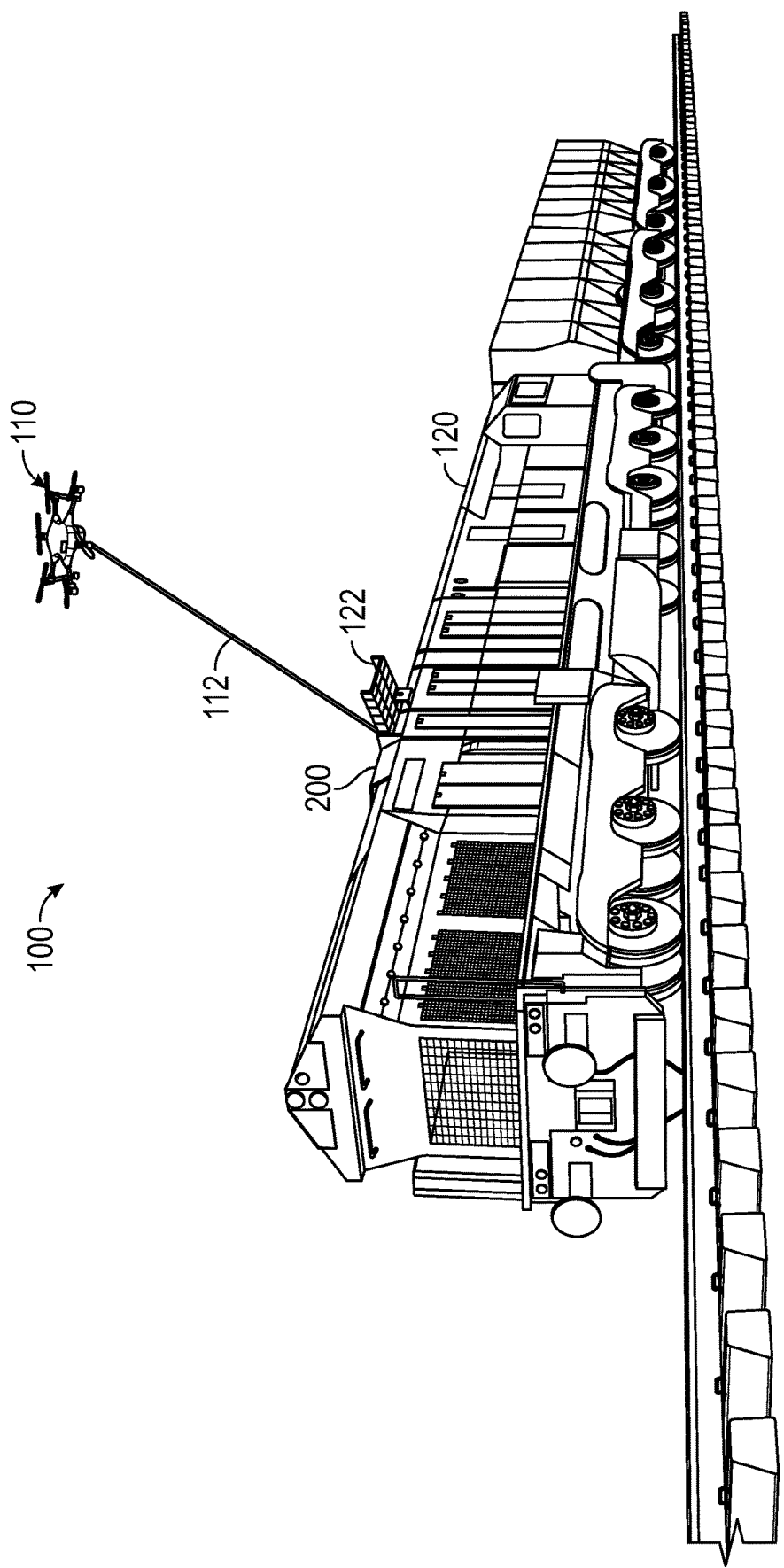
FIG. 1 is a perspective view of an unmanned aerial vehicle (UAV) system secured to a train for maintaining railway situational awareness in accordance with the principles of this disclosure.
Figure 2:
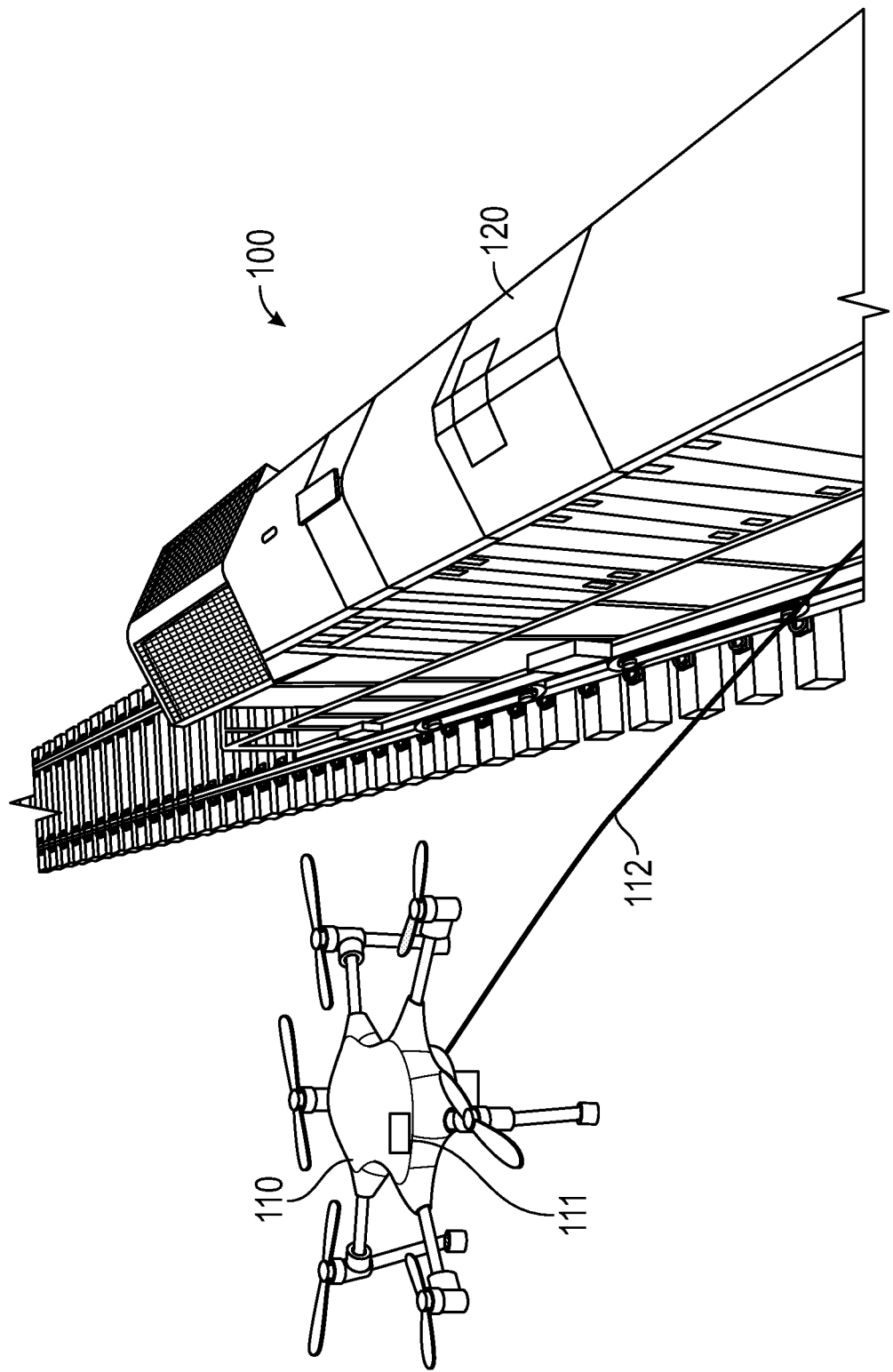
FIG. 2 is a top perspective view of the UAV system of FIG. 1.

FIGS. 1 and 2 illustrate an unmanned aerial vehicle (UAV) system 100. The system 100 generally includes a ground station 122 mounted to a train 120 (e.g., secured to the train roof), a UAV 110 (e.g., a drone), and a controller 200.

The ground station 122 may be mounted on a train roof or an external platform (e.g., via any suitable mounting technique, such as fastening, friction it, and/or straps/chains, etc.) integrated into the train 120. The ground station 122 is configured to house the UAV 110 when it is not in use. The ground station 122 may be disposed on and/or integrated with any car of train 120, for example, a locomotive. The ground station 122 generally includes a base plate, a power supply (not shown), and a communication transceiver (not shown). The ground station 122 is configured to supply power and/or communications to the UAV 110, and to store the UAV when not in use. The ground station 122 may include telemetry systems, wireless and/or wired communications, battery charging systems, and/or geolocation systems.

It is contemplated that the system 100 may utilize one or more UAVs 110. As can be appreciated, ground station 122 can have any suitable configuration for hosting any number of UAVs. For example, a base triangle (e.g., with three interconnected plates to host at least three UAVs such as one on each of the three outer surfaces of the triangle and/or one or more on each of the inner and/or outer surfaces thereof), a base square (e.g., with four interconnected plates to host at least four UAVs such as one on each of the four outer surfaces of the square and/or one or more on the inner and/or outer surfaces thereof), etc. may be provided. One way to implement a ground station is described in U.S. patent application Ser. No. 16/928,195, the contents of which are incorporated by reference in its entirety.

The train 120 may include, for example, a locomotive (or other rail cars) and/or other fixed path vehicles (such as a tram, streetcar, and/or trolley).

The UAV 110 generally includes a positioning system (e.g., GPS), a video system (not shown), sensors 111 (FIG. 2), and a wireless communication transceiver (not shown). The wireless transceiver is configured to communicate video, geolocation from the positioning system, and any relevant status of the UAV, or components thereof, such as status of the UAV, to the ground station 122 or other monitoring stations in accordance with any suitable techniques known to persons of ordinary skill in the art. The sensors may include, for example, radar, LIDAR, and/or imaging device(s).

In order to enable continuous surveillance of an area, the UAV 110 is tethered by a tether system 112 to the ground station 122. In some aspects, the UAV 110 may be untethered and/or selectively untetherable for enabling UAV 110 to roam or fly freely about the train/tracks. The tether system 112 is a permanent physical link in the form of a flexible wire and/or cable. The tether system 112 is configured to provide power and/or communications to the UAV 110. In aspects, the UAV may include wireless communications. For example, the UAV 110 may be tethered to a locomotive, inspecting rail cars that trail the locomotive. The tethered UAV 110 flying alongside the locomotive can, for example, inspect track ahead, surveil the surroundings for security purposes such as to prevent burglary, and/or provide situational awareness to an operator in case of emergency. One way to implement a UAV 110 with a tether is described in U.S. patent application Ser. No. 17/143,070, the contents of which are incorporated by reference herein in its entirety.

Figure 3:
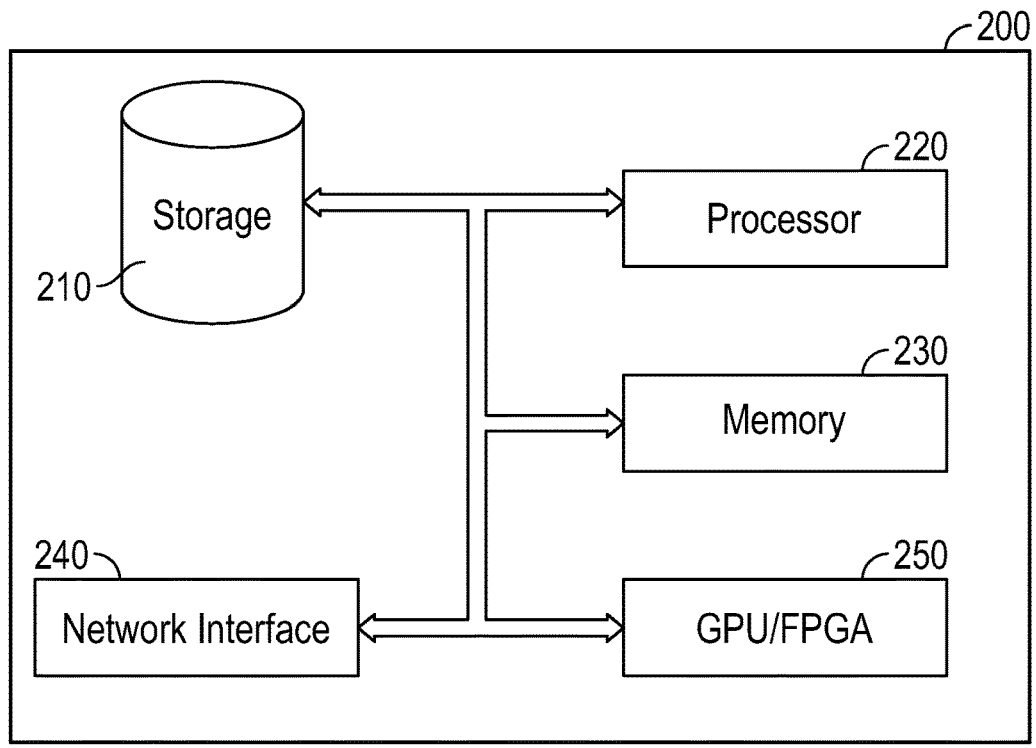
FIG. 3 is a block diagram of a controller configured for use with the UAV system of FIG. 1.

FIG. 3 illustrates the controller 200 that includes a processor 220 connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive, among other data, the UAV status, sensor 111 signals, and UAV location, and control, among other features, the baseplate's position and deployment of the UAV(s). The controller 200 may be further configured to control the operation of the storage and deployment of the UAVs.

Figure 4:
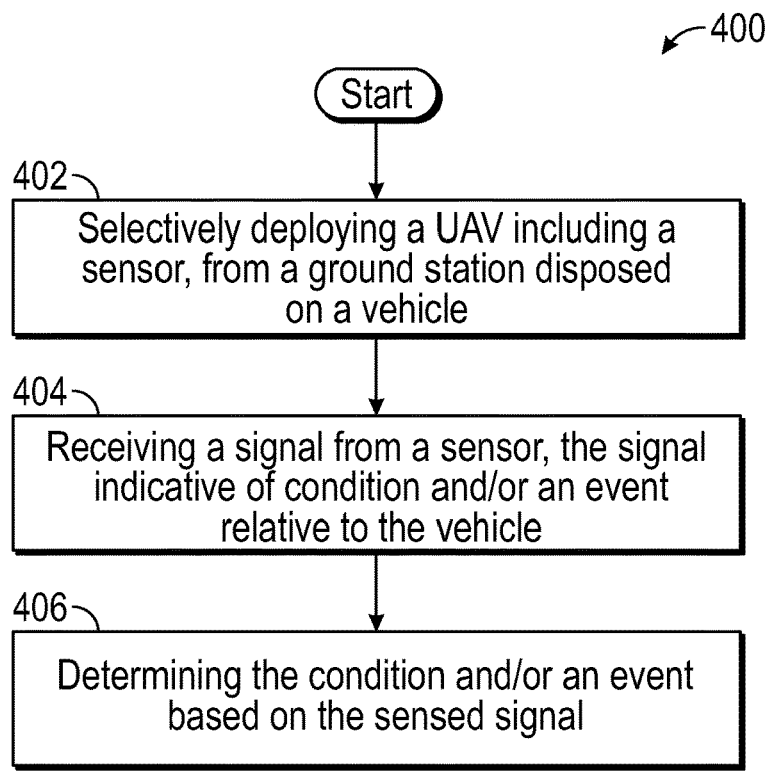
FIG. 4 is a block diagram of an exemplary method for maintaining railway situational awareness in accordance with the disclosure.

FIG. 4 shows a flow chart illustrating the various operations of an exemplary method for maintaining UAV flight continuity. Persons skilled in the art will appreciate that one or more operations of the method 400 may be performed in a different order, repeated, and/or omitted without departing from the scope of the disclosure. In various aspects, the illustrated method 900 can operate in controller 200 (FIG. 3), in a remote device, or in another server or system. Other variations are contemplated to be within the scope of the disclosure. The operations of method 400 will be described with respect to a controller, e.g., controller 200 (FIG. 2) of system 100 (FIG. 1), but it will be understood that the illustrated operations are applicable to other systems and components thereof as well.

By tethering the UAV 110 to a ground station 122 integrated into a train, the disclosed technology provides for on-the-go track inspection, 360-degree situational awareness, on-track obstacle avoidance, such as for hazards in proximity to, and including, the tracks, train car monitoring, burglary and theft (and vandalism, etc.) prevention, and event/disaster awareness.

Initially, at step 402, a UAV 110 is deployed from a ground station 122 disposed on a train 120 (e.g., on a locomotive). In aspects, the UAV 110 is tethered to the ground station 122 by a tether 112. Integration of the UAV 110 to the train 120 provides for optimized track/train inspection methods that can be completed without the need to halt commercial traffic and without the need for specialized trains. In aspects, the disclosed technology enables 360-degree situational awareness via imaging device(s) that provide 360-degree imaging. In aspects, the controller may process the 360-degree images to determine if an object and/or a condition/hazard exists in proximity to the train 120 (e.g., within a number of miles, a thousand yards, a hundred feet, etc., or less/more, although any suitable distance may be provided) or on/near the track and/or train itself.

The integrated tethered UAV 110 can inspect the tracks/train (and/or surrounding areas) throughout the course of normal locomotive operations. Furthermore, slow-moving cargo trains provide the opportunity to deploy a forward-looking UAV 110 that can detect, for example, hazards near or on the track or train itself, before the locomotive engineer will be able to see it (sometimes minutes or longer before), for example, around the next bend or over the next hill. In the case where the UAV 110 is integrated into the locomotive control panel (not shown), disaster can be avoided by braking the train with enough forewarning. For example, some Class I cargo trains can stretch about 10,000 to about 15,000 feet, pulling more than about 100 cars. A deployed UAV 110 can provide the engineer visuals along the entire length of the train in any of the cases relevant such as security, inspection, fire detection, detachment, and/or derailment.

Next, at step 404, the controller receives a signal from a sensor 111 on the UAV 110. The sensor may include radar, LIDAR, and/or an imaging device. The imaging device may further include infrared imaging and/or visual light imaging. The sensor 111 is configured to provide a signal indicative of a condition and/or an event relative to the train. For example, the sensor 111 may be a radar sensor, which detects, for example, an obstruction on the track. In another example, the sensor 111 may be an infra-red imaging device and may detect, for example, heat from a train car that is on fire.

Next, at step 406, the controller determines the condition and/or the event based on the sensed signal. For example, the controller 200 may determine that the signal indicates that the condition is a blocked track ahead. For example, the UAV 110 may also aid in preventing burglary of stationary trains inside train yards or when the train is traveling in remote regions. The deployed UAV 110 can serve as deterrents to would-be criminals and additionally can capture detailed footage of any nefarious activities that can be used to prosecute theft, vandalism, etc.

Additionally, the ability to deploy the UAV 110 instantly at the site of derailments or other train-related incidents can provide respondents with on-the-scene live feedback to better deploy their own response teams.

In aspects, the controller 200 may display, on a display, an indication of the determined condition and/or event. For example, the controller may display, for the engineer/conductor (and/or other personnel/passengers, a warning to slow the train or stop the train based on the blocked track. In aspects, the display may be remote from the train so that a remote controller may remotely effectuate efforts to stop the train such as from a remote control center in communication with train and/or UAV 110.

For example, the disclosed technology may enable hazard detection in any direction. The controller 200 may receive a signal from a sensor 111 on the UAV 110. The controller may detect a potential hazard, such as an object on the track like a fallen tree, a pedestrian, a car, or a rock. Next, the controller may classify the object based on a machine learning classifier (e.g., a convolutional neural network or a support vector machine). Next, the controller may determine the distance between the object and the train 120. The controller may send an indication of the distance/proximity and the classification of the object to the locomotive control panel (or to another device such as a mobile phone or a central terminal) to alert the engineer (driver) of the train 120. In aspects, the controller 200 may decrease the speed of the train 120.

In aspects, the controller 200 may detect a hazard out of a line of sight of the train based on the determined condition and/or event. The controller 200 may determine a proximity of the hazard relative to the train and display a notification indicating the determined distance and the classification of the hazard.

In aspects, the disclosed technology may enable train car monitoring. For example, the system may provide the engineer visuals (by displaying images from an imaging device on the UAV 110 on a display) along the entire length of the train in any of the cases relevant such as security, inspection, fire detection, detachment, and/or derailment.

The disclosed system may enable disaster response awareness and/or burglary and theft prevention. For example, the controller 200 may determine an unauthorized entry or trespass into or on the train (e.g., if a person is breaking into the train) based on the sensed signal and transmit an alert based on the determination to notify security personnel.

The system 100 may enable rail worker safety by sensing rail workers (as classified by a classifier) in and around the train 120. For example, the controller 200 would be able to automatically control the braking system of the locomotive and/or visually/audio alert the locomotive operator if it finds people on the tracks. For example, the sensors on the UAV 110 can identify people over five miles, enabling enough time for the train stopping distance which can reach about two miles. In aspects, the controller 200 may receive a signal from the sensor 111, indicating that a rail worker is working on the rails and/or the train. For example, the controller may stop the train 120 from moving in a case where the object is classified as a person, and the proximity is within a predetermined distance of the train. The controller 200 may then stop the train 120 from moving forwards and/or may transmit and/or display an alert warning the engineer (and/or other users) of the location of the rail workers.

The disclosed technology solves the problem of current solutions that include cameras mounted on the locomotive directly, where the effective FOV for the train mounted cameras is less than 1 mile in most cases, which does not enable the train to have enough time to stop.

Figure 5:
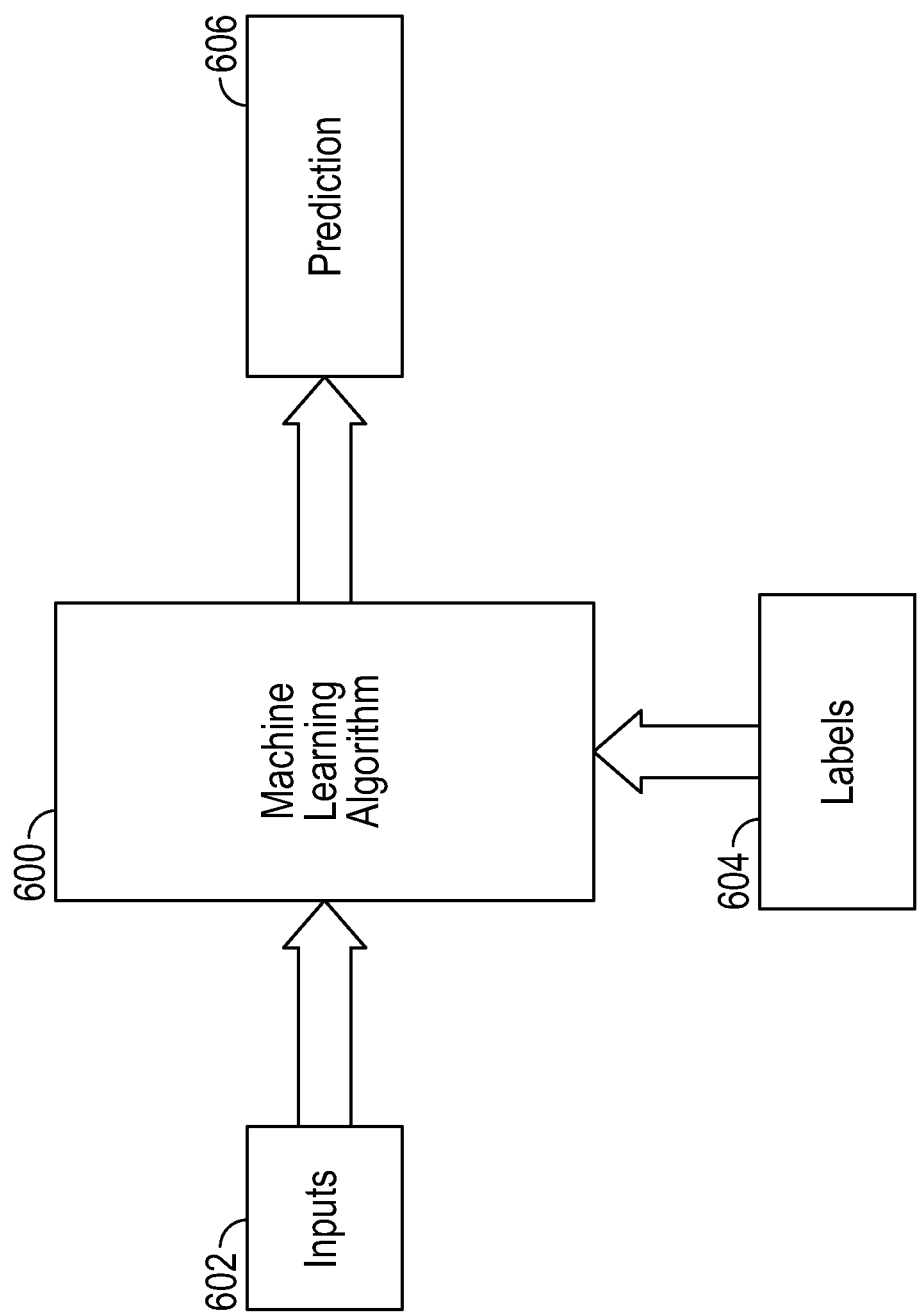
FIG. 5 is a flow diagram of a machine learning algorithm of the computer-controlled method for railway situational awareness using the UAV system of FIG. 1.

With reference to FIG. 5, the controller 200 may include a machine-learning algorithm 600 configured to make these evaluations. For example, the controller 200 may use machine learning to classify images. For example, machine learning may include a convolutional neural network (CNN) and/or a support vector machine (SVM). The CNN may be trained on previous image data, for example, images of objects such as trees, animals, and/or vehicles.

Figure 6:
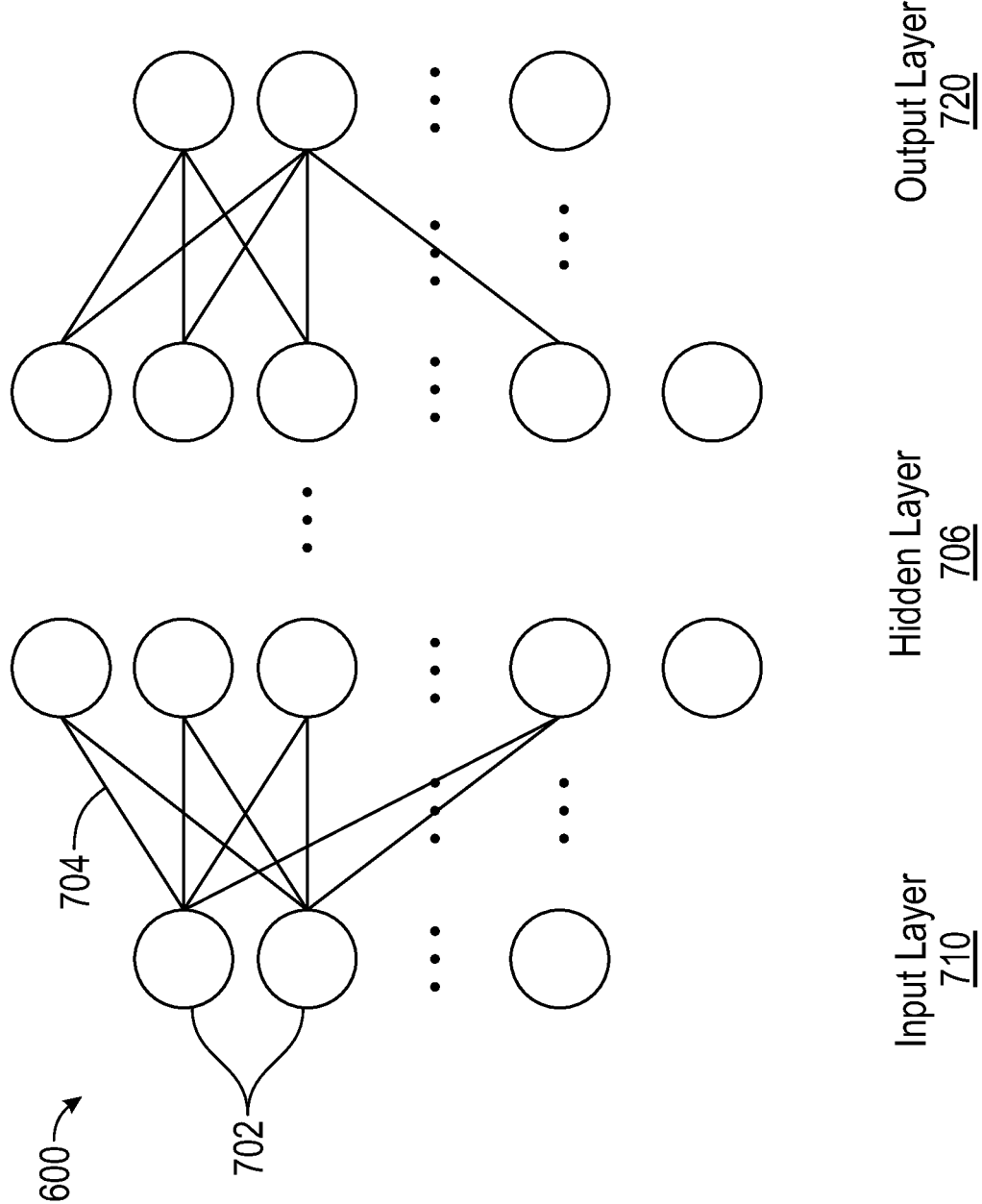
FIG. 6 is a diagram of layers of a neural network of FIG. 6 in accordance with aspects of the disclosure. Other aspects, features, and advantages will be apparent from the description, the drawings, and the claims that follow.

Referring to FIG. 6, generally, the machine learning network 600 (e.g., a convolutional deep learning neural network) of FIG. 5 includes at least one input layer 710, a plurality of hidden layers 706, and at least one output layer 720. The input layer 710, the plurality of hidden layers 706, and the output layer 720 all include neurons 702 (e.g., nodes). The neurons 702 between the various layers are interconnected via weights 674. Each neuron 702 in the machine learning network 600 computes an output value by applying a specific function to the input values coming from the previous layer. The function that is applied to the input values is determined by a vector of weights 704 and a bias. Learning, in the deep learning neural network, progresses by making iterative adjustments to these biases and weights. The vector of weights 704 and the bias are called filters (e.g., kernels) and represent particular features of the input (e.g., a particular shape). The machine learning network 600 may output logits.

It should be understood that the disclosed structure can include any suitable mechanical, electrical, and/or chemical components for operating the disclosed system or components thereof. For instance, such electrical components can include, for example, any suitable electrical and/or electro-mechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electro-mechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An unmanned aerial vehicle (UAV) system for maintaining railway situational awareness, the system comprising:
    a ground station configured to be mounted on at least one of a train roof or an external platform, and to house the UAV when the UAV lands on the ground station and the UAV is not in use, wherein the ground station includes a first door and a second door, each of the first and second doors configured to rotatable open when deploying or landing the UAV, the ground station further including an interior surface configured for receiving the UAV when the UAV lands;
    a UAV including a sensor, the sensor configured to provide a signal indicative of a condition and/or an event relative to the train;
    a processor; and
    a memory, containing instructions thereon, which, when executed by the processor, cause the system to:
        selectively deploy the UAV from the ground station mounted to the train;
        receive the signal from the sensor;
        determine the condition and/or the event, based on the sensed signal;
        detect an unauthorized entry or trespass on or into the train, or detect an object that is least one of:
            disposed at a predetermined position relative to the train based on the determined condition and/or event; or
            out of a line of sight of the train based on the determined condition and/or event;
        and wherein when the object is detected:
            classify the detected object based on a convolutional neural network;
            determine a proximity of the detected object relative to the train;
            display a notification indicating the determined distance and the classification of the detected object; and
            transmit a command to the train from the UAV causing the train to stop from moving based on the detected object being classified as a hazard and the proximity being within a predetermined distance of the train;
        and wherein when the unauthorized entry or trespass on or into the train is detected:
            transmit an alert based on the detected unauthorized entry or the detected trespass.

2. The system of claim 1, wherein the instructions, when executed by the processor, further cause the system to display, on a display, an indication of the determined condition and/or event.

3. The system of claim 1, wherein the sensor includes radar, LIDAR; and/or an imaging device.

4. The system of claim 1, wherein the UAV is tethered to the ground station.

5. The system of claim 1, wherein the instructions, when executed by the processor, further cause the system to:
transmit a command to reduce speed of the train based on the determined proximity of the object.

6. The system of claim 1, wherein the instructions, when executed by the processor, further cause the system to:
detect an object out of a line of sight of the train based on the determined condition and/or event;
determine a proximity of the object relative to the train; and
display a notification indicating the determined distance and the classification of the object.

7. The system of claim 1, wherein the instructions, when executed by the processor, further cause the system to:
determine an unauthorized entry or trespass on or into the train, based on the sensed signal; and
transmit an alert based on the determination.

8. The system of claim 1, wherein the ground station further includes a wireless transceiver configured to communicate sensor signals and location of the UAV to a remote server.

9. A computer-implemented method for maintaining railway situational awareness, comprising:
selectively deploying a UAV including a sensor, from a ground station mounted on at least one of a train roof or an external platform, wherein the ground station is configured to house the UAV when the UAV lands on the ground station and the UAV is not in use, wherein the ground station includes a first door and a second door, each of the first and second doors configured to rotatably open when deploying or landing the UAV, the ground station further including an interior surface configured for receiving the UAV when the UAV lands;
receiving a signal from a sensor, the signal indicative of condition and/or an event relative to the train;
determining the condition and/or the event based on the sensed signal;
detecting an unauthorized entry or trespass on or into the train, or detecting an object that is at least one of:
disposed at a predetermined position relative to the train based on the determined condition and/or event; or
out of a line of sight of the train based on the determined condition and/or event and wherein when the object is detected:
classifying the detected object based on a convolutional neural network;
determining a proximity of the detected object relative to the train;
displaying a notification indicating the determined distance and the classification of the detected object; and
transmitting a command to the train from the UAV causing the train to stop from moving based on the detected object being classified as a hazard and the proximity being within a predetermined distance of the train;
and wherein when the unauthorized entry or trespass on or into the train is detected:
transmitting an alert based on the detected unauthorized entry or the detected trespass.

10. The computer-implemented method of claim 9, wherein the UAV is tethered to the ground station.

11. The computer-implemented method of claim 9, wherein the sensor includes radar, LIDAR, and/or an imaging device.

12. The computer-implemented method of claim 9, further comprising displaying, on a display, an indication of the determined condition and/or event.

13. The computer-implemented method of claim 9, further comprising:
transmitting a command to reduce speed of the train based on the determined proximity of the object.

14. A non-transitory computer-readable medium storing instructions which, when executed by a processor, cause the processor to perform a method comprising:
selectively deploying a UAV including a sensor, from a ground station disposed on at least one of a vehicle roof or an external platform of a train, wherein the ground station is configured to house the UAV when the UAV lands on the ground station and the UAV is not use, wherein the ground station includes a first door and a second door, each of the first and second doors configured to rotatably open when deploying or landing the UAV, the ground station further including an interior surface configured for receiving the UAV when the UAV lands;
receiving a signal from a sensor, the signal indicative of condition and/or an event relative to the train;
determining the condition and/or the event based on the sensed signal;
detecting an unauthorized entry or trespass on or into the train, or detecting an object that is at least one of:
disposed at a predetermined position relative to the train based on the determined condition and/or event;
out of a line of sight of the train based on the determined condition and/or event and wherein when the object is detected:
classifying the detected object based on a convolutional neural network;
determining a proximity of the detected object relative to the train;
displaying a notification indicating the determined distance and the classification of the detected object; and
transmitting a command to the train from the UAV causing the train to stop from moving based on the detected object being classified as a hazard and the proximity being within a predetermined distance of the train;
and wherein when the unauthorized entry or trespass on or into the train is detected:
transmitting an alert based on the detected unauthorized entry or the detected trespass.

* * * * *